United States Patent [19]
Suu

[11] Patent Number: 6,154,014
[45] Date of Patent: Nov. 28, 2000

[54] VOLTAGE CONVERTER

[75] Inventor: Maurice Le Van Suu, Savigny le Temple, France

[73] Assignee: STMicroelectronics S.A., Gentilly, France

[21] Appl. No.: 09/306,125

[22] Filed: May 6, 1999

[30] Foreign Application Priority Data

May 7, 1998 [FR] France ................................. 98 05837

[51] Int. Cl.[7] ...................................................... G05F 1/56
[52] U.S. Cl. ............................... 323/222; 363/37; 363/89
[58] Field of Search ........................ 363/37, 89; 323/222

[56] References Cited

U.S. PATENT DOCUMENTS

| | | | |
|---|---|---|---|
| 5,691,889 | 11/1997 | Bazinet et al. | 363/89 |
| 5,696,439 | 12/1997 | Presti et al. | 323/283 |
| 5,701,238 | 12/1997 | Weidinger et al. | 363/21 |
| 5,982,156 | 11/1999 | Weimer et al. | 323/222 |

FOREIGN PATENT DOCUMENTS 0 425 039 A2  10/1990  European Pat. Off. ....... H02M 3/155

OTHER PUBLICATIONS

Patent Abstracts of Japan, vol. 016, No. 227, May 26, 1992 and JP 04042778A.

*Primary Examiner*—Peter S. Wong
*Assistant Examiner*—Gary L. Laxton
*Attorney, Agent, or Firm*—Theodore E. Galanthay; Allen, Dyer, Doppelt, Milbrath, & Gilchrist, P.A.

[57] ABSTRACT

A voltage converter includes a resonant element and a switch controlled by a management unit for regulating a quantity of energy transferred from the primary circuit to the secondary circuit. The voltage converter includes a circuit for generating the supply voltage for the management unit from the output voltage of the voltage converter, and a circuit for holding the switch in a closed position when the voltage converter is initialized.

48 Claims, 3 Drawing Sheets

VOLTAGE CONVERTER

FIELD OF THE INVENTION

The present invention relates to electronics, and, more particularly, to a DC/DC voltage converter.

BACKGROUND OF THE INVENTION

A DC/DC converter converts a DC voltage having a first value into a DC voltage having a second value different than the first value. In particular, chopped supply converters limit the current consumption to the value necessary to generate a desired value of voltage. FIG. 1 shows a DC/DC converter according to the prior art, which is known as a BUCK converter.

A BUCK converter has a transformer forming a resonant element. The transformer includes a primary winding L1 series-connected with a switch SW between two input terminals, E1 and E2 respectively. It also has a secondary winding L2 of which a first end is connected through a diode D1 to a first output terminal S1 of the converter. The cathode of the diode D1 is connected to the terminal S1. The second end of the winding L2 is connected to a second output terminal S2 of the converter.

The primary circuit of the converter is formed by the loop BP, as understood according to Kirchoff's laws, and includes the primary winding L1 and the switch SW, as well as the arms between the input terminals E1 and E2 of the converter. A voltage source (not shown) delivers a DC input voltage VE between the terminals E1 and E2.

The secondary circuit is formed by a loop BS including the secondary winding L2, the diode D1, as well as the arms connected between the output terminals S1 and S2. One of the arms includes an accumulation capacitor C2. The capacitor C2 and the secondary winding L2 form a resonant circuit. Another arm includes the load, symbolized by a resistor RC, which is parallel-connected to the accumulation capacitor C2 between the terminals S1 and S2.

The output voltage VS delivered to the terminals of the capacitor C2 and applied to the load RC is related to the input voltage VE by the relationship $VS=k \cdot VE$, where k is the conversion ratio of the converter. The cycles for the opening and the closing of the switch SW are controlled by a management unit UC. The secondary winding L2 stores the energy during the closing cycles and restores it, through the diode D1 to the capacitor C2 during the opening cycle. The flow of a load current through the load RC tends to discharge the accumulation capacitor C2. In other words, the opening and closing cycles of the switch SW chop the input voltage VE at a specified frequency called a chopping frequency. The voltage source delivering the voltage VE does not let through current unless the switch SW is closed. The efficiency of a converter of this kind is therefore very high.

The management unit UC generally delivers a pulse-width modulated signal to control the switch SW. The closing time of the switch SW per time unit or per period is dictated by the management unit UC which determines the value of the conversion ratio k. The management unit may be a microcontroller or a similar device. A device of this kind requires a supply circuit producing a low supply voltage of 5 volts, for example, for its operation.

The supply circuit includes a voltage source distinct from the one delivering the input voltage VE.

Any circuit including a converter of this kind must therefore have two supply sources. A first source generates the input voltage VE, and a second source generates the supply voltage of the management unit UC. This constraint places significant penalties with regards to manufacturing costs and the size of simple electronic circuits including a converter of this kind.

There are known circuits for generating a DC supply voltage of 5 volts from an input voltage VE. However, it is necessary to compensate for the variations of VE if this voltage is not maintained at a constant value. In other words, there is need for a regulation of the value of the voltage generated. These circuits are therefore complex. Furthermore, if the value of VE is significantly greater than the value of the supply voltage of the management unit UC, these circuits may have low efficiency. For example, if the supply voltage of the management unit UC is generated from VE by a drop in voltage across the terminals of a resistive element, significant heat is generated.

SUMMARY OF THE INVENTION

The present invention provides a voltage converter including a circuit generating the supply voltage of a management unit using the output voltage of the voltage converter, and a circuit maintaining a switch in a closed position when initializing the voltage converter so that a voltage is available at the terminals of the secondary circuit which is then used to supply the management unit when initialized.

The voltage converter has a resonant element, a primary circuit and a secondary circuit. A voltage circuit delivering a DC input voltage is applied to the terminals of the primary circuit, and a switch switches the current in the resonant element over to a specified frequency. The switch is controlled for regulating the quantity of energy transferred from the primary circuit to the secondary circuit through the resonant element so that the value of the output voltage delivered to the output terminals of the secondary circuit is related to the value of the input voltage by a determined conversion ratio.

The voltage converter thus generates the supply voltage for the management circuit from the output voltage of the voltage converter, and the voltage converter includes a circuit to overcome an operating defect of the voltage converter when initialized, i.e., the output voltage is not present and the management unit cannot operate without a supply voltage.

The expressions "initialized" or "starting up" as used above are understood to mean a short stage of operation that follows the powering on of the voltage converter. That is, the application of the input voltage VE to the input terminals of the primary circuit. Through the circuit, the management unit is supplied with a voltage formed by or generated from the output voltage of the voltage converter. The present invention therefore makes it possible to save on the use of a specific supply source for the supply of the management unit. Furthermore, the circuit for regulating the generated supply voltage of the management unit also regulates the output voltage of the voltage converter. No additional regulation circuits need to be added.

According to one embodiment of the present invention, the resonant element includes an inductor or choke instead of a transformer. This makes it possible, with the same voltage converter, to have a very wide dynamic range of input voltage for the same output voltage. With a transformer, the input dynamic range is limited by the transformer ratio of the transformer, which is fixed and is defined by the ratio of the number of turns of the secondary winding to the number of turns of the primary winding.

BRIEF DESCRIPTION OF THE DRAWINGS

Other features and advantages of the present invention shall appear from the following description. This description is given purely by way of an illustration and must be read with reference to the appended drawings, of which.

DETAILED DESCRIPTION OF THE PREFERRED EMBODIMENTS

Figure 1:
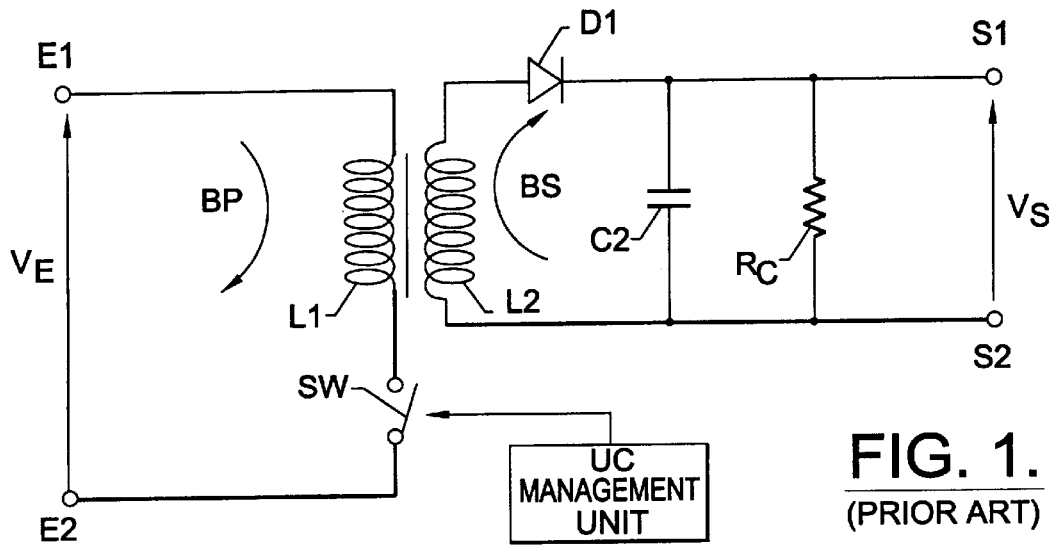
FIG. 1 is a drawing of a DC/DC voltage converter according to the prior art.
Figure 2:
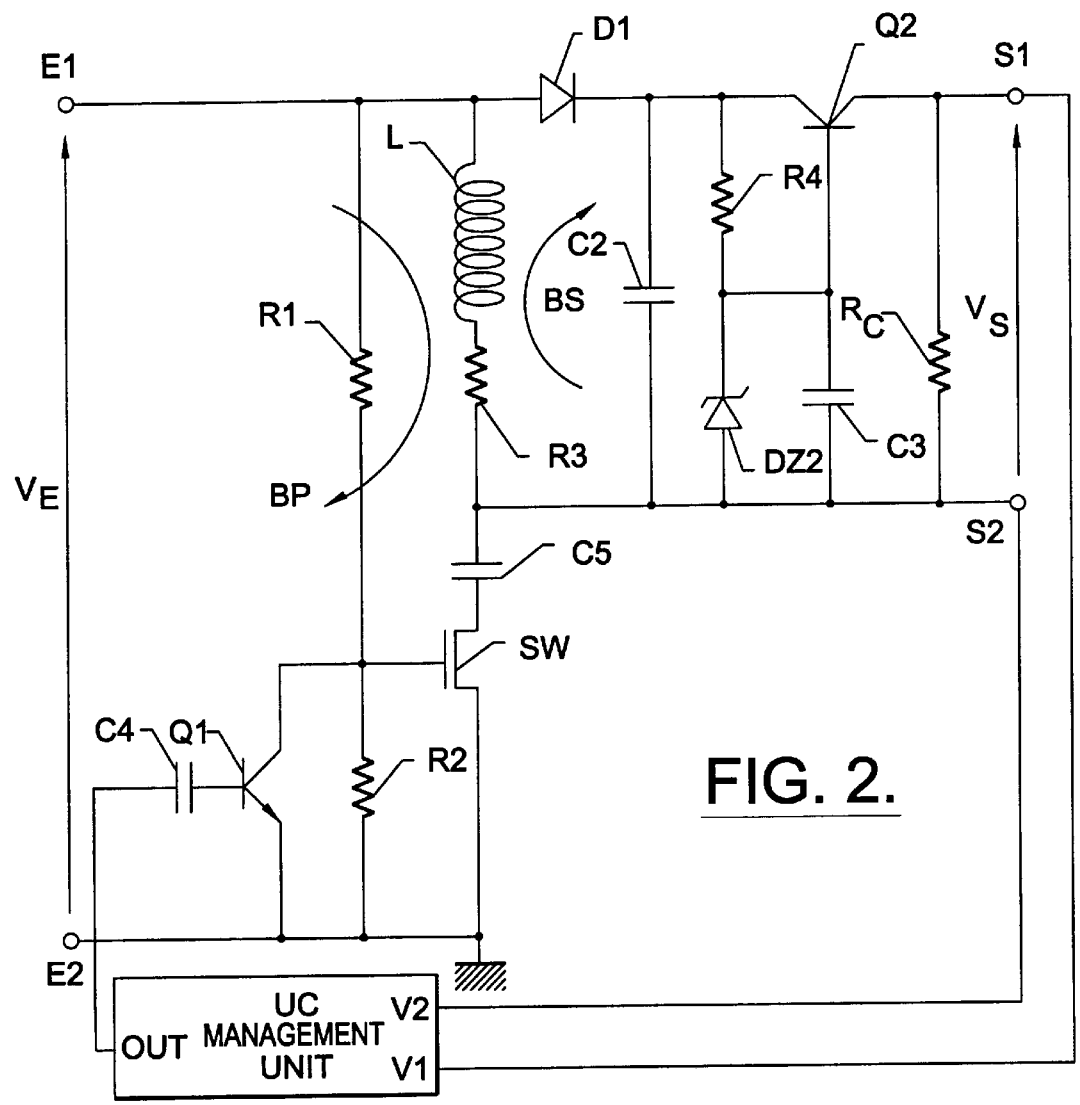
FIG. 2 is a drawing of an embodiment of a voltage converter according to the present invention.

FIG. 2 is a drawing of one embodiment of a voltage converter according to the present invention. The same elements in FIGS. 1 and 2 have the same references. In this embodiment, the voltage converter is a BUCK converter. The input voltage VE is applied between the input terminals E1 and E2 of the primary circuit of the voltage converter. In one example, node E2 is connected to ground.

In one embodiment, the resonant element is an inductor or choke L which is preferably series-connected with a resistor R3. The resonant element L-R3 is also series-connected with the switch SW between the inputs E1 and E2. The resonant circuit is also connected between the anode of the diode D1 and the output terminal S2 of the voltage converter. In other words, the resonant element L-R3 belongs both to the primary circuit (loop BP) and to the secondary circuit (loop BS).

The switch SW is preferably a power MOS transistor. Advantageously, a capacitor C5 is connected between the resonant element L-R3 and the drain of the transistor SW. The resonant element L-R3 and the accumulation capacitor C2 form a resonant circuit. The inductor L stores energy during the closing cycles of the switch SW, and restores it through the diode D1 to the capacitor C2 during the opening cycles of the switch. Furthermore, the capacitor C2 is also charged through the diode D1 from the input voltage VE during the closing cycles of the switch.

A bipolar transistor Q1 is parallel-connected between the control gate and the source of the transistor SW. More specifically, the collector and the emitter of the transistor Q1 are respectively connected to the control gate and to the source of the transistor SW. The base of the transistor Q1 receives, preferably through a decoupling capacitor C4, a control signal CS provided by an output OUT of the management or control unit UC.

The transistor Q1 operates in a saturation mode. Its function is to short-circuit the control gate and the source of the transistor SW to swiftly discharge the gate/source capacitance of this transistor when the transistor SW is opened. In this way, the switch-over of the transistor SW, when it is opened, takes place at a higher speed.

Through the invention which shall now be described in greater detail, no specific voltage source is needed for the supply of the management unit UC. In one embodiment, the management unit UC is supplied through the application (between two of its inputs V1 and V2) of the output voltage VS available between the respective output terminals S1 and S2 of the voltage converter. This is possible when the voltage VS is equal to the supply voltage of the management unit UC, which is 5 volts, for example.

The problem that arises is when the system starts up and no output voltage is available between the terminals S1 and S2. Consequently, the management unit is not supplied and the voltage converter cannot function. This is why the invention provides a circuit to keep this switch SW in a closed position when being initialized or started up. The transistor SW is held in the conducting state during a certain period of time after the voltage converter has been powered on, i.e., after the application of the voltage VE between the terminals E1 and E2.

These circuits include, for example, a bridge of resistors R1 and R2 series-connected between the terminals E1 and E2. The midpoint of this bridge is connected to the control gate of the transistor SW. In other words, the resistors R1 and R2 carry out the biasing of the transistor SW when the system is started up so that it is on.

In this way, the accumulation capacitor C2 positioned at the secondary winding is charged gradually to the value of VE minus a conduction voltage of the diode D1. A positive voltage is thus delivered between the output terminals S1 and S2 with a certain time constant. This voltage is clipped at the value of the voltage VS by a clipping circuit having a Zener diode that shall be described further below.

The voltage generated by the voltage converter during the starting phase enables the management unit UC to be put into operation. This step of putting the management unit into operation is prior to the generation of the control signal CS and the output OUT. The term "putting the management unit into operation" is understood to mean, for example, the establishment of an oscillation frequency for a clock signal generated internally by the management unit UC, or again, the initializing of a microcontroller if the management unit includes a circuit of this kind.

As soon as the management unit is put into operation, the control signal CS is delivered to the output OUT and the switch SW is switched over by the transistor Q1. The voltage converter may then operate in normal mode and the initialization phase has ended. According to an advantageous characteristic of the invention, the resistor R2 of the biasing bridge R1–R2 is short-circuited when the transistor Q1 is conductive, so that the transistor SW is off. In other words, the resistor R2 is short-circuited during the opening cycles of the switch SW. The transistor Q1, therefore, also has the function in normal operation of inhibiting the circuit that keeps the switch in a closed position during the starting up phase.

As shown in FIG. 2, the diagram of the converter according to the present invention is relatively straightforward since only the resistors R1 and R2 have been added to keep the switch SW in a closed position when being initialized or started up. In an advantageous embodiment, a circuit for clipping or regulating the output voltage of the converter includes a bipolar transistor Q2 connected by its collector to the cathode of the diode D1, by its emitter to the output terminal S1 of the voltage converter, and by its base to the output terminal S4 by via capacitor C3. Furthermore, a resistor R4 is connected by a first terminal to the cathode of the diode D1 and by a second terminal to the cathode of a Zener diode DZ2 whose anode is furthermore connected to the output terminal S2. The cathode of the diode DZ2 is furthermore connected to the emitter of the transistor Q2.

The Zener diode DZ2 has the function of clipping the output voltage VS of the converter at a maximum value. This value is equal to the value of the Zener voltage of the diode DZ2 plus the value of the base/emitter voltage of the transistor Q2. According to one advantage of the invention, the circuit for regulating the value of the supply voltage of the management unit UC also regulates the value of the output voltage VS of the converter since the first of these voltages is generated from the second one.

The transistor Q2 has the function of increasing the value of the output current of the voltage converter, namely the value of the current that can flow in the load resistor RC. When there is no transistor Q2, the value of the output current is limited to approximately 20 mA while, in the presence of the transistor Q2, the output current may reach 100 mA or even 150 mA. The role of the resistor R3 is to limit the current in the inductor L. Furthermore, the capacitor CS enables the voltage at the terminals of the accumulation capacitor C2 to be reduced. This enables the use of a capacitor C2 having a lower breakdown voltage, that is, a capacitor that also costs less. This is particularly advantageous in applications where the input voltage VE is high, 220 volts for example.

Example values of the main passive components of the voltage converter circuit shown in FIG. 2 are stated as follows. The value of the inductor L is 3.3 mH. The value of the accumulation capacitor C2 is 220 µF. The resistors R1 and R2 have resistance values equal to 10 kΩ each. The resistor R3 is equal to 100 Ω and the resistance value of the resistor R4 is equal to 500 Ω. The value of the capacitor C5 is 470 nF, capacitor C4 is 10 µF and capacitor C2 is 220 nF.

The converter described above has high properties of stability of the output voltage VS for an input voltage that can vary from 10 volts to 260 volts. The dynamic range of the input voltage VE of the converter is therefore great, owing to the fact that it is an inductor and not a transformer that is used as a resonant element.

If the output voltage VS is equal to the supply voltage of the management unit UC, then the output terminals S1 and S2 of the converter may respectively be connected to the inputs V1 and V2 of the management unit UC, as shown in FIG. 2. However, if the value of the voltage VS is greater than the value of the supply voltage of the management unit UC, then this supply voltage could be generated from the voltage VS by a voltage divider bridge.

It is necessary for the value of the input voltage VE to be greater than the value of the supply voltage of the management unit UC, plus the value of the conduction voltage of the diode D1. Since this conduction voltage may be overlooked, it is sufficient for VE to be greater than the supply voltage of the management unit UC, that is, 5 volts for example. The control signal CS generated by the management unit UC is a pulse-width modulated signal with a frequency of 20 KHz.

The value of the period of the signal may be adapted to take account the current consumption in the load. To this end, those skilled in the art know that an increase in the period ratio of the control signal CS causes a greater increase in the conduction time of the transistor SW per time unit, so that a greater quantity of energy may be transferred from the primary circuit to the secondary circuit through the resonant element.

The management unit UC includes a circuit to achieve a feedback control of the output voltage VS of the converter to a specified fixed value. For example, after analog/digital conversion of the value of the voltage VS and the processing of this value according to an appropriate algorithm, a determination is made of the period of the control signal CS therefrom. An algorithm of this kind may be a fuzzy logic algorithm, for example.

Figure 3:
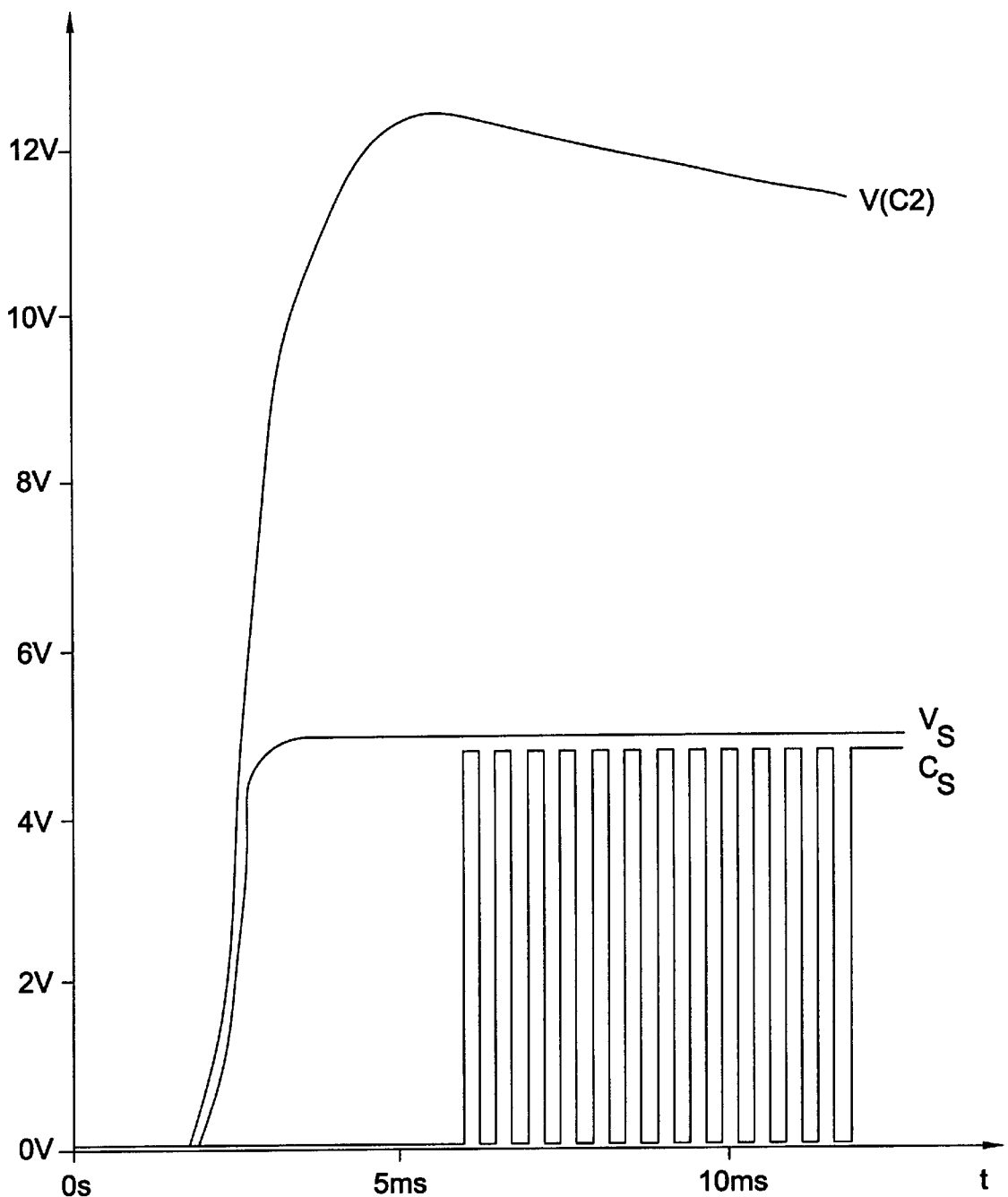
FIG. 3 is a graph showing the voltage at the terminals of the accumulation capacitor, the output voltage of the converter, and the control signal of the switch when the voltage converter is initialized according to the present invention.

The graph of FIG. 3 shows the curves of the voltage V(C2) at the terminals of the accumulation capacitor C2, the output voltage VS of the voltage converter, and the control signal CS during the starting up phase and slightly beyond this phase. The starting up phase lasts several milliseconds, and is a function of the ratio between the voltage VE and VS, and is a function of the time needed for placing the management unit into operation. The curves of FIG. 3 have been produced using the simulation software SPICE for a value of the DC input voltage VE equal to 12 volts, and for a value of the DC output voltage VS equal to 5 volts.

The input voltage VE is applied to the terminals E1 and E2 at the initial instant. At the end of 2 ms, the voltage V at the terminals of the capacitor C2 reaches approximately 12 volts, and the output voltage reaches a value regulated at 5 volts. It is only approximately 4 ms later, that is, about 6 ms after the initial instant that the control signal CS is delivered by the management unit at its output OUT. Therefore, the starting phase lasts about 6 ms.

The invention has been described hereabove in its application to a DC/DC voltage converter of the BUCK type. However, it can also be applied to other types of DC/DC converters, for example, a FLYBACK type converter. The resonant element may include a transformer with a primary coil, a secondary coil and a magnetic core instead of a simple inductor.

Figure 4A:
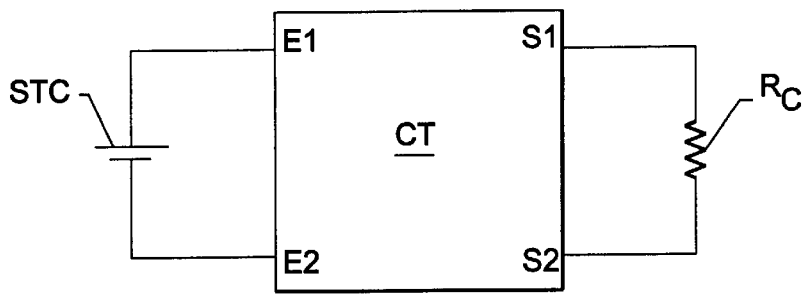
FIGS. 4a to 4d respectively show a DC/DC converter, an AC/DC converter, a DC/AC converter and an AC/AC converter including a voltage converter according to the present invention.

In FIG. 4a, a DC/DC voltage converter includes a voltage converter CT as shown in FIG. 2, whose load RC has been isolated. The DC input voltage VE is delivered by a DC voltage source STC. The invention can also be applied to an AC/DC, a DC/AC and an AC/AC voltage converter. Those skilled in the art will be capable of relating these different possibilities to the case of a DC/DC converter considered in the above exemplary embodiment.

It is possible to convert an AC voltage into a DC voltage by a full-wave rectifier circuit having four accurately connected diodes. A circuit of this kind is commonly called a rectifier bridge. Similarly, it is possible to convert a DC voltage into an AC voltage by a circuit known as an H bridge, which includes four accurately connected and accurately controlled transistors. Thus, in FIG. 4b, an AC/DC converter includes a voltage converter CT as described in FIG. 2 preceded by a full-wave rectifier bridge having four diodes D41 to D44. The input voltage VE (AC) is delivered by an AC voltage source STA connected in the rectifier bridge.

Figure 4B:
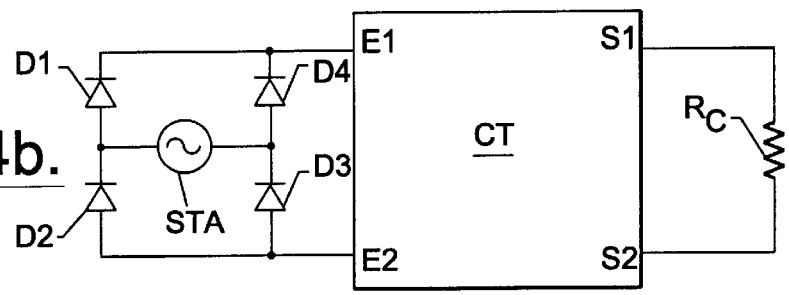
Figure 4C:
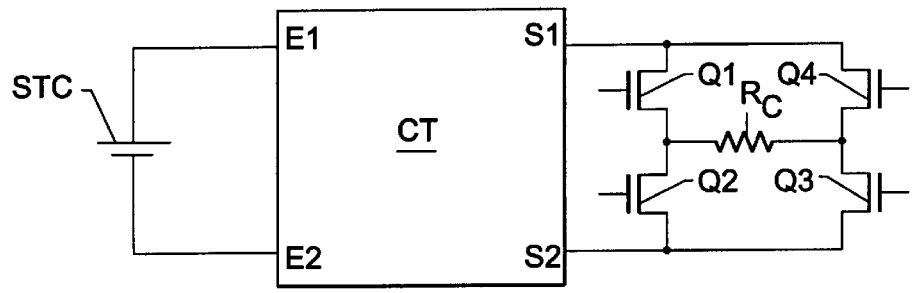

Similarly, in FIG. 4c, a DC/AC voltage converter includes a voltage converter CT as described in FIG. 2 followed by an H bridge having four transistors Q41 to Q44. The load resistor RC is connected in the H bridge. The transistors Q41 to Q44 are, for example, MOS transistors receiving appropriate control signals at their respective control gates. Signals of this kind may be generated, for example, by the management unit UC. The input voltage VE (DC) is delivered by a DC source STC.

Figure 4D:
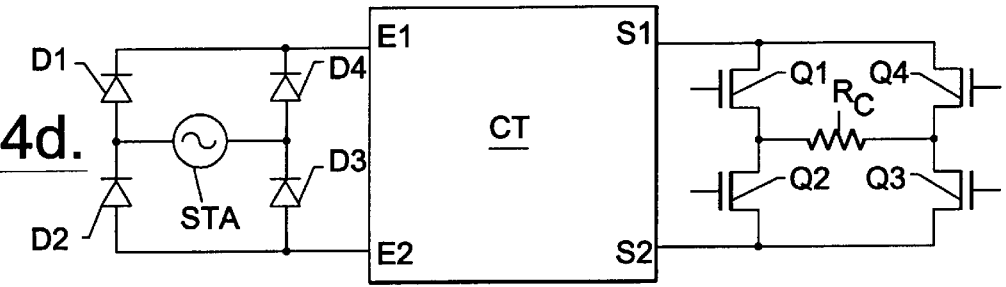

Similarly again, in FIG. 4d, an AC/AC voltage converter includes a voltage converter CT as described in FIG. 2 preceded by a rectifier bridge identical to that of FIG. 4b, and followed by an H bridge identical to that of FIG. 4c. The input voltage VE is delivered by an AC voltage source STA connected in the rectifier bridge. The load RC is connected in the H bridge.

What is claimed is:

1. A voltage converter comprising:
   a primary circuit receiving an input voltage;
   a secondary circuit providing an output voltage;
   a resonant element connected between said primary and secondary circuits;
   a switch connected to said resonant element;
   a management unit connected to said switch for regulating a quantity of energy transferred from said primary circuit to said secondary circuit through said resonant element so that a value of the output voltage provided by said secondary circuit is related to a value of the input voltage according to a predetermined conversion ratio;
   a supply circuit for generating a supply voltage for said management unit from the output voltage provided by said secondary circuit; and
   a switch circuit for maintaining said switch in a closed position when the voltage converter is initialized to cause energy transfer from said primary circuit to said secondary circuit which in turn causes said supply circuit to generate the supply voltage to power said management unit during initialization.

2. A voltage converter according to claim 1, wherein said switch comprises a MOS transistor having a gate; and wherein said switch circuit comprises a plurality of resistors connected between input terminals of said primary circuit, said plurality of resistors forming a voltage divider having a midpoint connected to the gate of said MOS transistor.

3. A voltage converter according to claim 1, wherein said resonant element comprises an inductor.

4. A voltage converter according to claim 3, wherein said resonant element further comprises a resistor series-connected to said inductor.

5. A voltage converter according to claim 2, wherein said primary circuit further comprises a bipolar transistor parallel-connected between the gate and a source of said MOS transistor, said bipolar transistor having a base receiving a control signal provided by said management unit.

6. A voltage converter according to claim 1, wherein said primary circuit further comprises a capacitor connected between said resonant element and said switch.

7. A voltage converter according to claim 1, wherein said primary circuit further comprises a voltage divider connected to the output voltage and supplying a supply voltage for said management unit less than the output voltage.

8. A voltage converter according to claim 1, wherein said management unit further comprises a feedback circuit providing a feedback control link for setting the output voltage to a predetermined fixed value.

9. A voltage converter according to claim 8, wherein said feedback circuit implements a fuzzy logic algorithm.

10. A voltage converter according to claim 1, wherein the input voltage is a DC voltage and the output voltage is a DC voltage so that the voltage converter defines a DC/DC voltage converter.

11. A voltage converter according to claim 1, further comprising a rectifier bridge connected to said primary circuit so that the voltage converter defines an AC/DC voltage converter.

12. A voltage converter according to claim 1, further comprising an H bridge connected to said secondary circuit so that the voltage converter defines a DC/AC voltage converter.

13. A voltage converter according to claim 1, further comprising a rectifier bridge connected to said primary circuit and an H bridge connected to said secondary circuit so that the voltage converter defines an AC/AC voltage converter.

14. A voltage converter comprising:
   a primary circuit receiving an input voltage;
   a secondary circuit providing an output voltage;
   a resonant element connected between said primary and secondary circuits;
   a switch circuit connected to said resonant element, said switch circuit comprising a switch and a voltage divider having a midpoint connected to said switch, and said voltage divider being connected across input terminals of said primary circuit for holding said switch in a closed position when the voltage converter is being initialized to cause energy transfer from said primary circuit to said secondary circuit which in turn causes said supply circuit to generate the supply voltage to power said management unit during initialization;
   a management unit connected to said switch for regulating a quantity of energy transferred from said primary circuit to said secondary circuit through said resonant element; and
   a supply circuit connected to the output voltage provided by said secondary circuit and supplying a supply voltage for said management unit less than the output voltage.

15. A voltage converter according to claim 14, wherein said switch comprises a MOS transistor having a gate; and wherein the midpoint of said voltage divider is connected to the gate of said MOS transistor.

16. A voltage converter according to claim 14, wherein said resonant element comprises an inductor.

17. A voltage converter according to claim 16, wherein said resonant element further comprises a resistor series-connected to said inductor.

18. A voltage converter according to claim 14 further comprising a bipolar transistor parallel-connected to said switch, said bipolar transistor having a base receiving a control signal provided by said management unit.

19. A voltage converter according to claim 14, further comprising a capacitor connected between said resonant element and said switch.

20. A voltage converter according to claim 14, further comprising a feedback circuit providing a feedback control link for setting the output voltage to a predetermined fixed value.

21. A voltage converter according to claim 20, wherein said feedback circuit implements a fuzzy logic algorithm.

22. A voltage converter according to claim 14, wherein the input voltage is a DC voltage and the output voltage is a DC voltage so that the voltage converter defines a DC/DC voltage converter.

23. A voltage converter according to claim 14, further comprising a rectifier bridge connected to said primary circuit so that the voltage converter defines an AC/DC voltage converter.

24. A voltage converter according to claim 14, further comprising an H bridge connected to said secondary circuit so that the voltage converter defines a DC/AC voltage converter.

25. A voltage converter according to claim 14, further comprising a rectifier bridge connected to said primary circuit and an H bridge connected to said secondary circuit so that the voltage converter defines an AC/AC voltage converter.

26. A voltage converter comprising:

a resonant element connected between an input and an output of the voltage converter;

a switch connected to said resonant element;

a management unit connected to said switch for regulating a quantity of energy transferred from the input to the output through said resonant element so that a value of an output voltage delivered to the output is related to a value of an input voltage according to a predetermined conversion ratio;

a supply circuit for generating a supply voltage for said management unit from the output voltage; and a switch circuit for maintaining said switch in a closed position when the voltage converter is being initialized to cause energy transfer from the input to the output which in turn causes said supply circuit to generate the supply voltage to power said management unit during initialization.

27. A voltage converter according to claim 26, wherein said switch comprises a MOS transistor having a gate; and wherein said switch circuit comprises a plurality of resistors connected between the input, said plurality of resistors forming a voltage divider having a midpoint connected to the gate of said MOS transistor.

28. A voltage converter according to claim 26, wherein said resonant element comprises an inductor.

29. A voltage converter according to claim 28, wherein said resonant element further comprises a resistor series-connected to said inductor.

30. A voltage converter according to claim 27, further comprising a bipolar transistor parallel-connected between the gate and a source of said MOS transistor, said bipolar transistor having a base receiving a control signal provided by said management unit.

31. A voltage converter according to claim 26, further comprising a capacitor connected between said resonant element and said switch.

32. A voltage converter according to claim 26, further comprising a voltage divider connected to the output voltage and supplying a supply voltage for said management unit less than the output voltage.

33. A voltage converter according to claim 26, further comprising a feedback circuit providing a feedback control link for setting the output voltage to a predetermined fixed value.

34. A voltage converter according to claim 33, wherein said feedback circuit implements a fuzzy logic algorithm.

35. A voltage converter according to claim 26, wherein the input voltage is a DC voltage and the output voltage is a DC voltage so that the voltage converter defines a DC/DC voltage converter.

36. A voltage converter according to claim 26, further comprising a rectifier bridge connected to the input so that the voltage converter defines an AC/DC voltage converter.

37. A voltage converter according to claim 26, further comprising an H bridge connected to the output so that the voltage converter defines a DC/AC voltage converter.

38. A voltage converter according to claim 26, further comprising a rectifier bridge connected to the input and an H bridge connected to the output so that the voltage converter defines an AC/AC voltage converter.

39. A method for converting an input voltage to an output voltage, the method comprising the steps of:

applying an input voltage to a resonant element;

holding a switch circuit connected to the resonant element in a closed position when the input voltage is initially applied to the resonant element to cause energy transfer energy from the input voltage to the output voltage during initialization;

controlling the switch circuit with a management unit for regulating a quantity of energy transferred from the input voltage to the output voltage through the resonant element so that a value of the output voltage is related to a value of the input voltage according to a predetermined conversion ratio; and generating a supply voltage for the management unit from the output voltage using a supply circuit, the supply voltage being less than the output voltage and the supply voltage being generated during initialization to power the management unit.

40. A method according to claim 39, wherein the switch circuit comprises a MOS transistor having a gate, and a voltage divider connected to the gate of the MOS transistor, wherein the method further comprises the step of dividing the input voltage for activating the MOS transistor.

41. A method according to claim 39, wherein applying the input voltage comprises the step of applying the input voltage to an inductor.

42. A method according to claim 41, wherein applying the input voltage comprises the step of applying the input voltage to an inductor in series with a resistor.

43. A method according to claim 40, wherein the switch circuit further comprises a bipolar transistor having a base; the method further comprising connecting in parallel between the gate and a source of the MOS transistor the bipolar transistor for receiving a control signal provided by the management unit.

44. A method according to claim 39, further comprising connecting a capacitor between the resonant element and the switch.

45. A method according to claim 39, wherein a voltage divider is connected to the output voltage, and further comprising the step of supplying the supply voltage for the management unit less than the output voltage.

46. A method according to claim 39 further comprising setting the output voltage to a predetermined fixed value using a feedback control link.

47. A method according to claim 46, wherein the feedback control link circuit comprises the step of implementing a fuzzy logic algorithm.

48. A method according to claim 39, wherein the input voltage is a DC voltage and the output voltage is a DC voltage so that the voltage conversion defines a DC/DC voltage converter.

* * * * *